(12) United States Patent  
Hoyte (10) Patent No.: US 6,985,822 B2  
(45) Date of Patent: Jan. 10, 2006

(54) METHODS AND SYSTEMS FOR PROXIMITY SYSTEM TARGET MATERIAL VARIATION EFFECTS REDUCTION

(75) Inventor: Scott Mordin Hoyte, Carson City, NV (US)

(73) Assignee: General Electric Company, Schenectady, NY (US)

( * ) Notice: Subject to any disclaimer, the term of this patent is extended or adjusted under 35 U.S.C. 154(b) by 86 days.

(21) Appl. No.: 10/722,991

(22) Filed: Nov. 26, 2003

(65) Prior Publication Data

US 2005/0114051 A1    May 26, 2005

(51) Int. Cl.  
G01R 25/00 (2006.01)  
G01B 7/14 (2006.01)

(52) U.S. Cl. .................................. 702/65; 324/207.16

(58) Field of Classification Search .................. 702/65; 324/207.16, 207.11, 207.26, 699, 716  
See application file for complete search history.

(56) References Cited

U.S. PATENT DOCUMENTS

| | | | | |
|---|---|---|---|---|
| 4,659,988 A | * | 4/1987 | Goff et al. ............. | 324/207.25 |
| 4,823,071 A | * | 4/1989 | Ding et al. ................. | 324/662 |
| 4,950,986 A | * | 8/1990 | Guerrero ............... | 324/207.19 |
| 5,371,462 A | * | 12/1994 | Hedengren et al. ........ | 324/225 |
| 5,854,553 A | | 12/1998 | Barclay et al. | |
| 6,249,123 B1 | * | 6/2001 | Rankin ....................... | 324/393 |
| 6,346,807 B1 | * | 2/2002 | Slates .................... | 324/207.16 |
| 6,377,039 B1 | | 4/2002 | Goldfine et al. | |
| 6,424,146 B2 | * | 7/2002 | Demma et al. ......... | 324/207.16 |
| 6,570,377 B1 | * | 5/2003 | Demma et al. ........ | 324/207.26 |
| 6,850,077 B2 | * | 2/2005 | Slates ........................ | 324/693 |
| 6,873,149 B1 | * | 3/2005 | Hoyte et al. ........... | 324/207.16 |

* cited by examiner

Primary Examiner—Bryan Bui  
Assistant Examiner—Toan M. Le  
(74) Attorney, Agent, or Firm—Armstrong Teasdale LLP (57) ABSTRACT

A method of determining a gap defined between an eddy current proximity transducer and a target is provided. The method includes populating a data structure with data points that are relative to a predetermined target property, determining a complex impedance value of the transducer relative to a plurality of selected data structure data points, and determining at least one of a target material property and the gap based on an interpolation of the plurality of selected data structure data points relative to the complex impedance value.

24 Claims, 8 Drawing Sheets

METHODS AND SYSTEMS FOR PROXIMITY SYSTEM TARGET MATERIAL VARIATION EFFECTS REDUCTION

BACKGROUND OF THE INVENTION

The present invention relates generally to eddy current proximity systems and, in particular, to methods and systems used to facilitate reducing target material variation effects on digital eddy current proximity systems.

At least some known eddy current proximity systems may experience gap output signal variations that are relative to variations within a target material rather than variations of the actual gap distance. Specifically, variations in the target material properties may affect the proximity system output similar to a variation in gap distance. Such target material properties may be the result of mechanical or electrical runout, material anomalies, variations in material permeability, variations in material resistivity, plated surfaces, target surface damage, and/or magnetization. Specifically, in rotary targets, runout may be periodic in nature and may have a once-per-revolution content such that the proximity system may interpret such runout as shaft motion and vectorially add the total runout to the true target motion.

Runout may be generally defined as a mechanical imperfection in rotary machine shafts. Runout may also describe an output signal of a vibration pick-up that does not represent shaft vibratory motion, but rather is caused by the eccentricity of the shaft, by surface irregularities, and by properties of the shaft material that cause the vibration probe or transducer to give an incorrect vibration signal.

Proper finishing of the target surface may facilitate reducing mechanical runout, and/or shaft-peening and burnishing may facilitate reducing electrical runout. However, the aforementioned techniques have historically only been partially successful. Accordingly, within at least some known digital eddy current proximity systems, a known method that has been employed to attempt to remove or cancel the effects of variations in the target material properties by deriving an electrical signal that corresponds to the runout and then subtracting this runout signal from the vibration signal. However, such methods and systems may not be able to determine a correction signal in real-time that is adequate to significantly reduce the effects of the target material variation reliably.

BRIEF DESCRIPTION OF THE INVENTION

In one aspect, a method of determining a gap defined between an eddy current proximity transducer and a target is provided. The method includes populating a data structure with data points that are relative to a predetermined target property, determining a complex impedance value of the transducer relative to a plurality of selected data structure data points, and determining at least one of a target material property and the gap based on an interpolation of the plurality of selected data structure data points relative to the complex impedance value.

In another aspect, a system for determining a gap defined between an eddy current proximity transducer and a target is provided. The system includes a memory comprising a data structure with data points that are relative to a predetermined target property, and a processor configured to control execution of instructions to determine a complex impedance value of the transducer relative to a plurality of selected data structure data points, and control execution of instructions to determine at least one of a target material property and the gap based on an interpolation of the plurality of selected data structure data points.

DETAILED DESCRIPTION OF THE INVENTION

Figure 1:
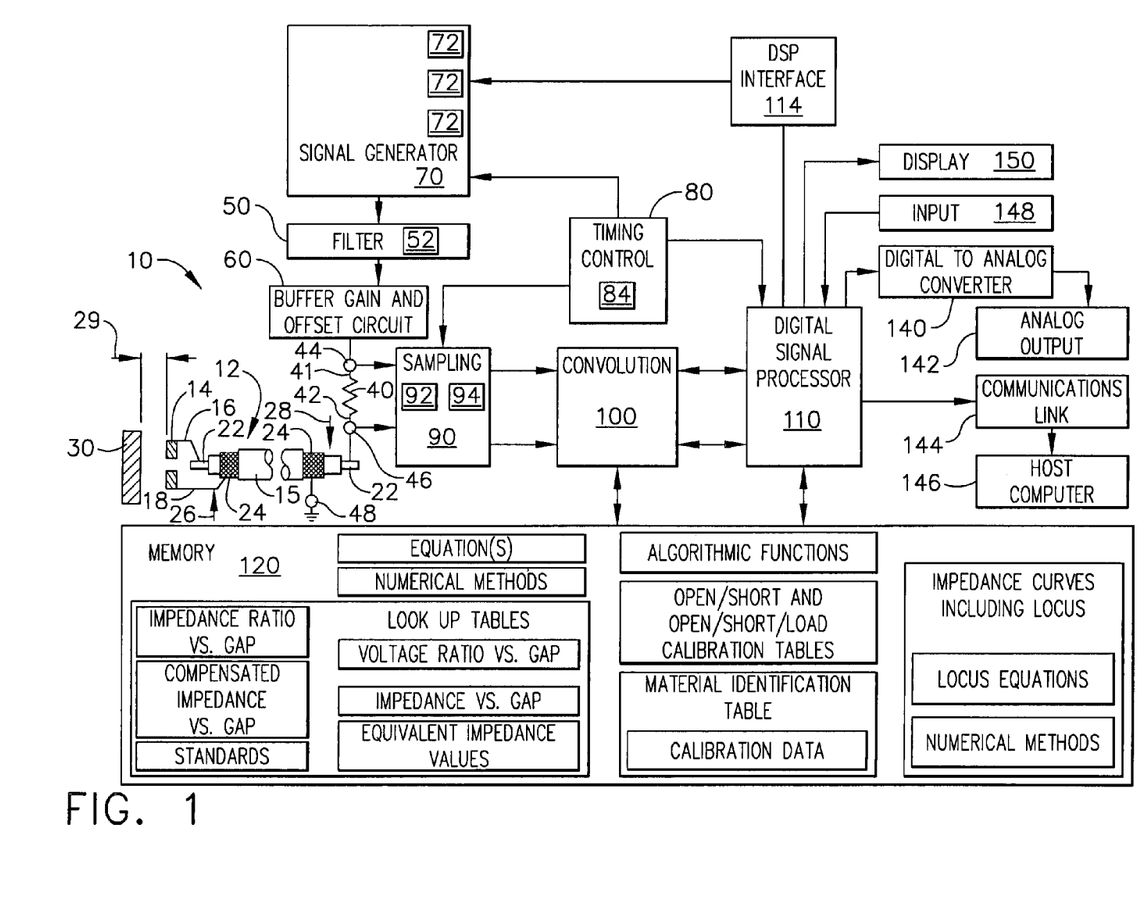
FIG. 1 is a schematic block diagram of an exemplary digital eddy current system.

FIG. 1 is a schematic block diagram of an exemplary digital eddy current system 10 that includes a transducer 12 operatively coupled to system 10. System 10 includes a voltage ratio method (VR method) used for digitally measuring an unknown electrical impedance of transducer 12. Transducer 12 includes an integral sensing element or coil 14 and a multi-conductor transducer cable 15. Sensing element 14 includes a first electrical lead 16 and a second electrical lead 18. Transducer cable 15 includes a first conductor 22 and a second conductor 24 extending from a first end 26 to a second end 28 of transducer cable 15.

At cable first end 26, first conductor 22 and second conductor 24 are each operatively coupled to the first electrical lead 16 and second electrical lead 18 of sensing element 14, respectively. At cable second end 28, first conductor 22 is coupled to second terminal 42 of resistor 40 at node 46 and second conductor 24 is coupled to ground node 48, thereby grounding one lead of the unknown dynamic transducer impedance $Z_{unknown}$.

In the exemplary embodiment, transducer 12 is coupled to a machine for sensing raw dynamic data that may be correlated to a gap distance 29 defined between transducer 12 and a conductive or metallic target 30, such as, but, not limited to a rotating shaft of the machine or an outer race of a rolling element bearing being monitored. The electrical impedance measured at the conditioning circuitry is the electrical combination of target 30, transducer 12 including sensing coil 14 and cable 15, an extension cable, if there is one, (not shown) and the circuitry of system 10. This impedance is usually called the "tank impedance" or parallel impedance ($Z_p$).

Digital eddy current system 10 includes a resistor 40 having a resistance value R, and a first terminal 41 and a second terminal 42 that are respectively coupled between a first node 44 and a second node 46.

Transducer 12 has an unknown dynamic transducer impedance having a value $Z_{unknown}$ and is coupled between second terminal 42 of resistor 40 at node 46 and a ground node 48. Accordingly, resistor 40 and transducer 12 form a serial electrical connection.

Digital eddy current system 10 also includes a filter 50, a signal generator 70, a timing control circuit 80, a sampling circuit 90, a convolution circuit 100 and a digital signal processor (DSP) 110. Signal generator 70 is operatively coupled to resistor first terminal 41 at node 44 through filter 50 for driving a signal through resistor 40, and transducer 12 thereby impressing a first voltage $V_1$ across serially connected resistor 40 and transducer 12, and a second voltage $V_2$ only across transducer 12. As used herein, the term "processor" also refers to microprocessors, central processing units (CPU), application specific integrated circuits (ASIC), logic circuits, and any other circuit or processor capable of executing inspection system, as described herein.

In the exemplary embodiment, signal generator 70 is operatively coupled to resistor 40 at node 44 via filter 50 and to digital signal processor (DSP) 110 for driving a programmable dynamic signal of one or more frequencies through filter 50 and the serial connection of the resistor 40/transducer 12 combination. Specifically, signal generator 70 includes a current source, such as, a direct digital synthesis (DDS) device 72 that is operatively coupled to resistor first terminal 41 via filter 50 and buffer, gain and offset circuit 60 for driving the dynamic signal or waveform through resistor 40 and transducer 12.

This dynamic signal causes the first voltage $V_1$ to be impressed across the serial connection of resistor 40 and transducer 12 and causes the second voltage $V_2$ to be impressed only across transducer 12. In the exemplary embodiment, transducer sensing element 14 is coupled proximate target 30 such that this dynamic signal causes sensing element 14 to generate an alternating magnetic field that induces eddy currents in the metallic target 30. In turn, the eddy currents in target 30 induce a voltage in sensing element 14 and hence, a change in an impedance of transducer 12 which varies as a function of, for example, variations of gap distance 29 between transducer 12 and target 30.

In the exemplary embodiment, signal generator 70 includes a plurality of DDS devices 72 coupled to resistor first terminal 41 via filter 50 and buffer, gain and offset circuit 60 for driving a plurality of dynamic signals at different frequencies through resistor 40 and transducer 12, and subsequently performing processing including convolution for obtaining simultaneous impedance measurements of transducer 12 at different frequencies which may be correlated to gap distance 29 between transducer 12 and target 30. Simultaneous impedance measurements facilitates determining gap 29 in real-time. As used herein, real-time refers to outcomes occurring at a substantially short period after a change in the inputs affecting the outcome. The period is the amount of time between each iteration of a regularly repeated task. Such repeated tasks are called periodic tasks. The time period is a design parameter of the real-time system that may be selected based on the importance of the outcome and/or the capability of the system implementing processing of the inputs to generate the outcome.

Each DDS device 72 may be coupled to DSP 110 via interface 114 and generates a pure frequency/phase-programmable dynamic signal such as a sinusoidal wave. DSP 110 may include an algorithm to program both the frequency and the phase of the output signals which in turn may be used to drive transducer 12 with a frequency/phase-programmable dynamic analog signal having an output frequency/phase which may be precisely manipulated under full digital control. Therefore, each DDS device 72 may be digitally programmed to output sine waves at a plurality of frequencies/phases with precision for use as driving signals or reference signals. In one embodiment, DDS device 72 is a device such as part number AD9850 commercially available from Analog Devices, Norwood, Mass.

Filter 50 is electrically coupled between DDS device 72 and resistor 40 for filtering the analog dynamic signals output from DDS device 72. In the exemplary embodiment, filter 50 includes at least one low pass filter 52 electrically coupled between each DDS device 72 and first terminal 41 of resistor 40 to purify the output dynamic signals or waveforms of each DDS device 72 for eliminating, for example, harmonics created in DDS device 72. For example, as a result of the outputs of DDS devices 72 being ten plus bit digital to analog converters, the quantization noise is filtered out using a low pass filter. Therefore, filters 52 remove the steps and facilitate smoothing out the analog dynamic signal outputs from DDS devices 72. Additionally, filters 52 facilitates reducing the noise bandwidth of the system 10 to improve a signal to noise ratio. In one embodiment, low pass filters 52 are five pole elliptical filter devices.

In the exemplary embodiment, buffer, gain and offset circuit 60 is electrically coupled between filter 50 and resistor 40 for buffering and amplifying the analog dynamic signals and providing any desired offset of the analog dynamic signals. Sampling circuit 90 is coupled to first node 44 for sampling and digitizing voltage $V_1$ impressed across the serially connected resistor 40/transducer 12 combination. Additionally, sampling circuit 90 is coupled to second node 46 for sampling and digitizing voltage $V_2$ that is impressed only across transducer 12. In the exemplary embodiment, sampling circuit 90 includes a pair of analog-to-digital converters (ADC) 92 and 94 coupled to first node 44 and second node 46 respectively for sampling and digitizing the first dynamic voltage $V_1$ and the second dynamic voltage $V_2$. In one embodiment, ADCs 92 and 94 are fourteen bit, wide bandwidth converters such as part number AD6644 commercially available from Analog Devices, Norwood, Mass.

Timing control circuit 80 provides synchronization between the output signal of signal generator 70 and the sampling rate of sampling circuit 90 such that the phase relationship between the output signal and samples is maintained. Timing control circuit 80 is operatively coupled to each DDS device 72, of ADCs 92 and 94, and to DSP 110. Therefore, DDS devices 72 are clocked by timing control circuit 80 such that the frequency of the output of DDS devices 72 is accurately set. Additionally, timing control circuit 80 provides synchronization between the output of DDS devices 72 and the sampling rate of ADCs 92 and 94 such that a phase relationship between the dynamic driving signal(s) and the sampled signals is maintained. Accordingly, sampling may be performed in synchrony with the dynamic driving signals.

Timing control circuit 80 includes a quartz clock oscillator 84 that is operatively coupled to each DDS device 72 for providing a clock signal to each DDS device 72.

DDS device 72 and ADCs 92 and 94 are also clocked by oscillator 84 to ensure a consistent phase between signal generator 70 and sampling circuit 90. In the exemplary embodiment, DDS devices 72 each generate a discreet frequency which are then summed together before being transmitted to transducer 12. In the exemplary embodiment, the frequencies are 100 kHz, 500 kHz, and 1.102 MHz. In other embodiments, other frequencies may be used and more or less than three frequencies may be used.

Convolution circuit 100 may be a stand-alone device in the form of, for example, a digital down counter (DDC). In the exemplary embodiment, convolution circuit 100 is coupled between sampling circuit 90 and DSP 110 to do the convolution operation. Analog-to-digital converted voltages $V_{1D}$ and $V_{2D}$ are received and convolved by convolution circuit 100 and then transmitted to DSP 110 as complex voltage numbers $V_{1C}$ and $V_{2C}$. Convolution circuit 100 may be programmed to process a predetermined frequency. In one embodiment, convolution circuit 100 is a digital down counter (DDC) such as part number HSP 50216, commercially available from Intersil Corporation, Milpitas, Calif.

In an alternative embodiment, digital convolution circuit 100 is integrally formed with digital signal processor 110 wherein DSP 110 is operatively coupled to ADCs 92 and 94 for receiving the first and second digitized voltage signals $V_{1D}$ and $V_{2D}$ from ADCs 92 and 94 and convolving the digitized voltages into respective complex voltage numbers $V_{1C}$ and $V_{2C}$ via integral convolution circuit 100. A DSP 110 having an integral convolution circuit 100 such as the 210XX series of devices is commercially available from Analog Devices, Norwood, Mass. The process of convolving the digitized voltages into respective complex voltage numbers $V_{1C}$ and $V_{2C}$ via convolution circuit 100 is defined as in-phase and quadrature detection or quadrature synthesis. The calculated impedance may be converted by the processor 110 into a voltage or gap value correlative to the gap distance 29 between transducer 12 and target 30 being monitored by using equation(s), algorithms, numerical methods or lookup tables stored in, for example, a memory 120 coupled to processor 110. The impedance or gap values may be outputted via a digital-to-analog converter 140 to an analog output 142. Analog output 142 may include, for example, alarms, relays, and circuit breakers that may be set to trip when the analog output is outside a predetermined nominal operating range.

The impedance or gap values may be outputted through a communications link 144 to a host computer 146 for further processing for the use of monitoring rotating or reciprocating machinery. An input 148, such as, but not limited to a keyboard, a pointing device, a voice command circuit and/or touch screen may be used to input data or modify settings of system 10 through a menu driven interface which may be viewed on a display 150. The input data may be used immediately in calculations or may be stored in memory 120 for later use. Display 150 may include, for example, a CRT or LCD monitor, and/or hardcopy device.

In operation, a radio frequency (RF) signal is transmitted from transducer coil 14 such that a RF field is created around the transducer tip. In the exemplary embodiment, the RF field extends to a gap distance 29 greater than approximately 0.1 inches (100 mils). When target 30 is present in the RF field, eddy currents flow in the surface of target 30. A penetration depth of the eddy currents depends on a conductivity and permeability of target 30. For example, the penetration depth of E4140 steel is approximately 0.003 inches (3 mils). When transducer 12 is close enough to target 30 to cause eddy currents to flow in target 30, the RF signal is affected, in that, the RF signal amplitude is at a minimum when gap distance 29 between transducer 12 and target 30 is at a minimum, resulting in a maximum of eddy current flow in target 30. Similarly, the RF signal amplitude is at a maximum when gap distance 29 between transducer 12 and target 30 is at a maximum, resulting in a minimum of eddy current in target 30. Additionally, when target 30 is moving slowly within the RF field, the RF signal amplitude increases or decreases slowly. If the target is moving rapidly within the RF field, the RF signal amplitude increases or decreases rapidly. Oscillatory movement of target 30 causes the RF signal to modulate, such as when target 30 is vibrating in relation to transducer 12.

Figure 2:
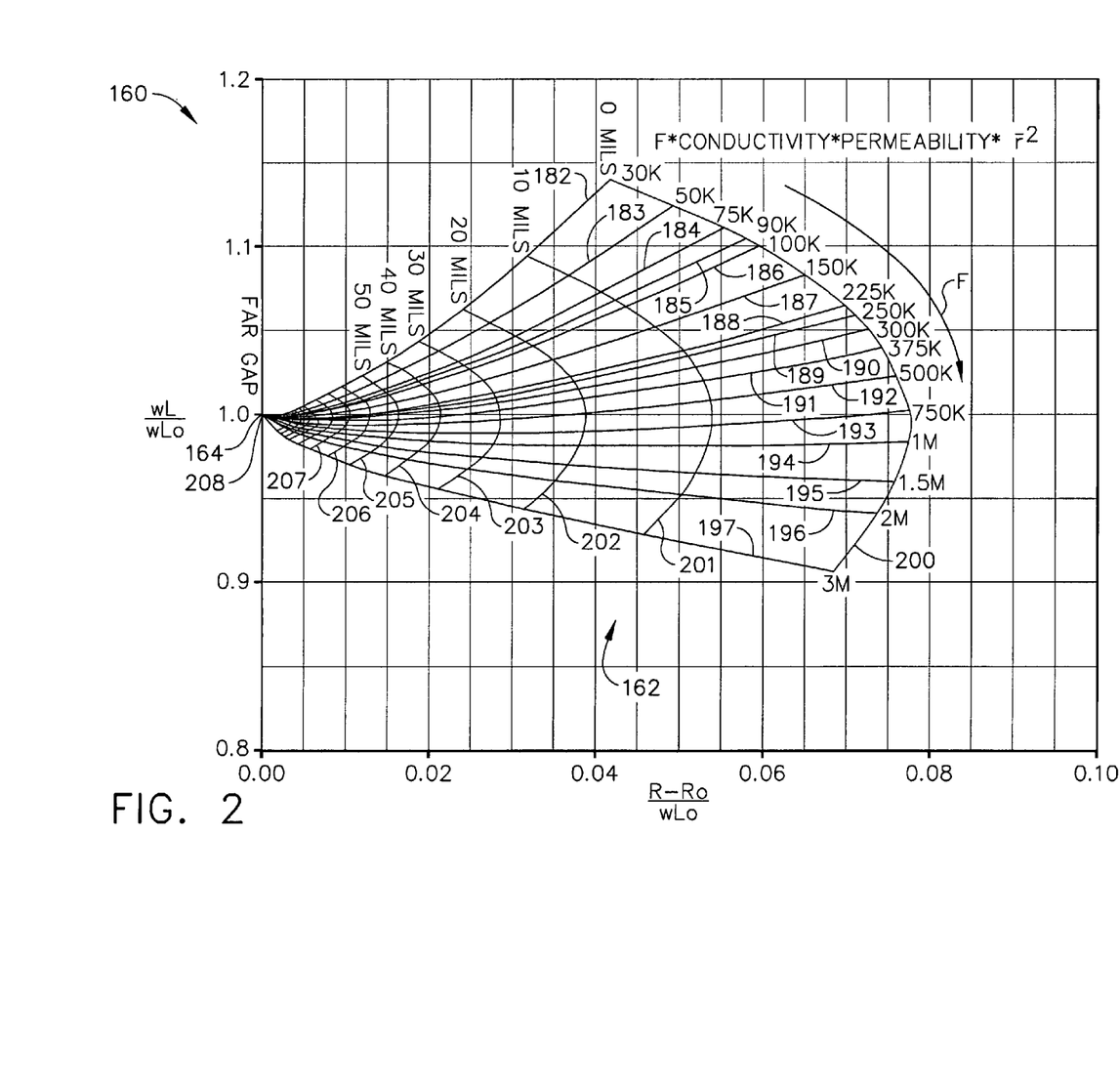
FIG. 2 illustrates a normalized impedance diagram for the transducer and the target shown in FIG. 1.

FIG. 2 illustrates a normalized impedance diagram 160 for transducer 12 and target 30 that includes a plurality of normalized impedance curves 162. In the exemplary embodiment, diagram 160 is generated by measuring the impedance of transducer 12 at different excitation frequencies and at different gap distance values from target 30. In the one embodiment, target 30 is fabricated from E4140 steel. A plurality of lines 182 through 197 that radiate outward from an origin 164, located at 0.0, 1.0 on diagram 160, are gap lines. They represent the normalized impedance due to target 30 at a constant frequency and varying gap distance value that is changed from a near gap position, represented by the rightmost ends of the lines to a far gap position, represented by origin 164. These lines rotate clockwise along arrow F as the frequency is increased. A plurality of arcs 200 through 208 represent the impedance of transducer 12 when transducer 12 is located at a fixed gap distance value from target 30 as the excitation frequency is varied.

In operation, graph 160 may be determined by:

1. Measure a far gap impedance of transducer 12 wherein the far gap impedance=$R_0+j\omega L_0$.

2. Measure an impedance of transducer 12 near target 30 wherein near gap impedance=$R+j\omega L$.

3. Determine a normalized impedance which is comprised of a normalized resistance term and a normalized reactance term as follows:

Normalized resistance=$(R-R_0)/\omega L_0$ and

Normalized reactance=$\omega L/\omega L_0$.

4. Plot each point on diagram 160 and connect the points collected at the same frequency.

5. Connect the points collected at the same gap distance value thereby obtaining a graph as shown in FIG. 2.

Each target material has a unique characteristic normalized impedance diagram. The curves of each diagram are affected by the characteristics of the target and it has been observed that the curves rotate clockwise as the conductivity and permeability of the target increase. Also, it has been observed that there is a greater reactive change with gap distance than there is a resistive change as the conductivity and permeability of the target increase.

The above described method of determining a normalized impedance diagram may be used to measure the far gap and the near gap impedance of the transducer in combination with an extension cable to obtain a normalized impedance diagram of the transducer/extension cable combination.

Additionally, one or more normalized impedance curves may be generated by taking a transducer and measuring its impedance at different frequencies and different gap distance values with different target materials and storing this information in, for example, memory 120.

Figure 3:
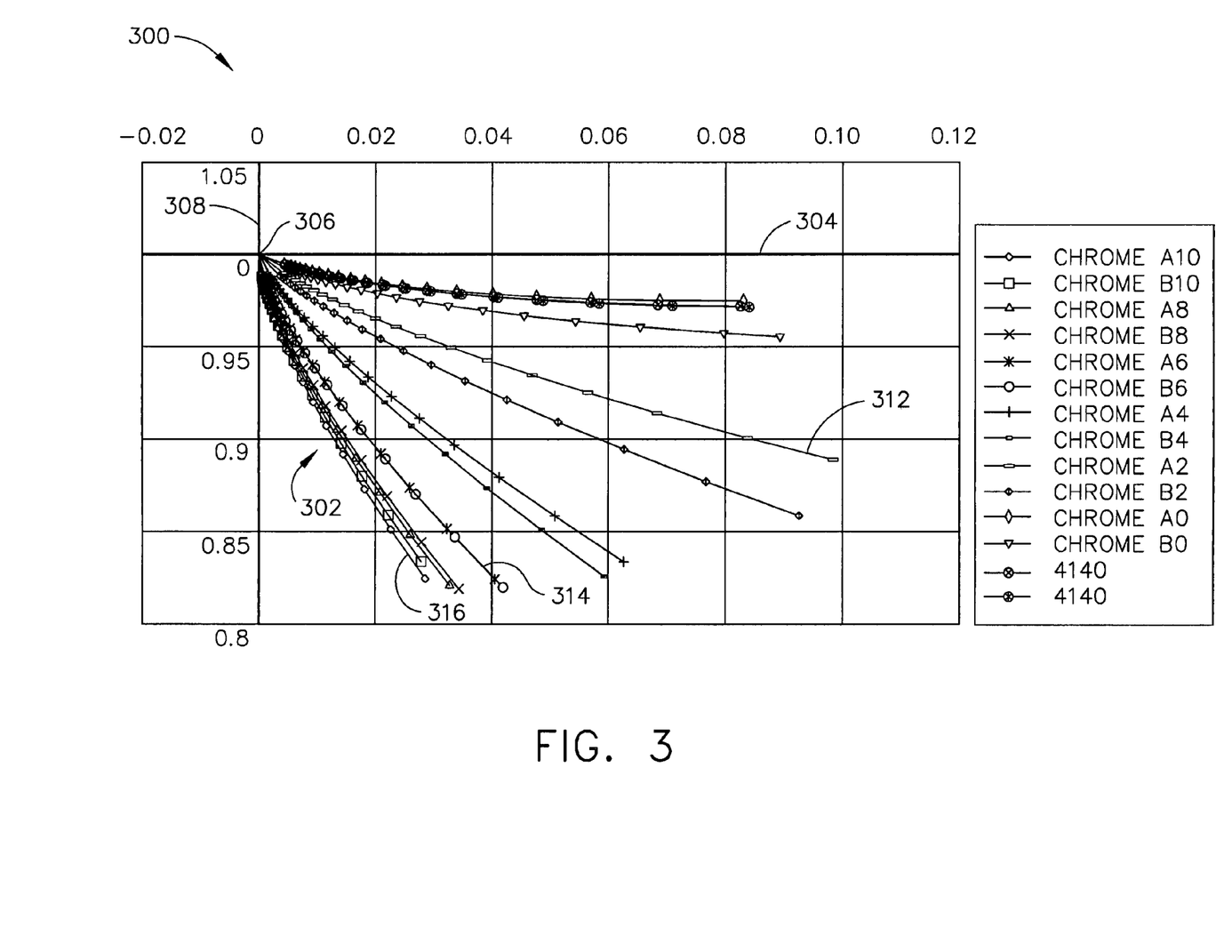
FIG. 3 is a graph of a plurality of exemplary normalized impedance curves for a target with varying material characteristics.

FIG. 3 is a graph 300 of a plurality of exemplary normalized impedance curves for a target with varying material characteristics. Such a target may be, for example, a precision wheel fabricated from 4140 steel with a circumferentially varying chrome thickness from zero mils to fourteen mils plated over the 4140 steel base wheel, such that the resulting wheel is substantially perfectly round in cross-section. In the exemplary embodiment, target 30 (shown in FIG. 1) was positioned at different gap distances 29 at a radial of a chrome thickness then sequentially repositioned to radials of different chrome thicknesses. Recording a transducer impedance at each position of gap versus radial yields a plurality of curves 302 that relate to material property differences of target 30. In the exemplary embodiment, curves 302 are substantially similar to curves 162 (shown in FIG. 2) that relate to varying the excitation frequency of transducer 12.

Graph 300 includes an x-axis 304 that illustrates increasing (upward on graph 300) and decreasing normalized resistance of transducer 12 from a graph origin 306. An y-axis 308 illustrates increasing (towards the right on graph 300) normalized impedance of transducer 12 from origin 306 to y-axis extremis 310. A plurality normalized impedance curves 162 illustrates the impedance of transducer 12 in response to various gaps 29 at a plurality of target material properties. For example, a trace 312 illustrates the normalized impedance of transducer 12 at a radial corresponding to a chrome thickness of two mils, a trace 314 illustrates the normalized impedance of transducer 12 at a radial corresponding to a chrome thickness of six mils, and a trace 316 illustrates the normalized impedance of transducer 12 at a radial corresponding to a chrome thickness of ten mils. The normalized impedance of transducer 12 at far gap is illustrated at origin 306 and the normalized impedance of transducer 12 at near gap is illustrated at an x-axis right extremis of each of the plurality of curves 302. Each data point on graph 300 corresponds to an impedance of transducer 12 at a particular gap and a respective material property, such as the thickness of chrome plate covering the base 4140 steel at the radial where the reading was taken. Each trace of the plurality of curves 302 has a corresponding data structure located in memory 120 that permits an interpolation of data points to determine a corresponding gap. In the exemplary embodiment, the data structure is a look-up table. In an alternative embodiment, the data structure is a curve equation. The determined gap may be may be output textually and/or graphically via display 50 (shown in FIG. 1). Additionally, the determined gap may be output electronically via output 142 and/or link 144.

Figure 4:
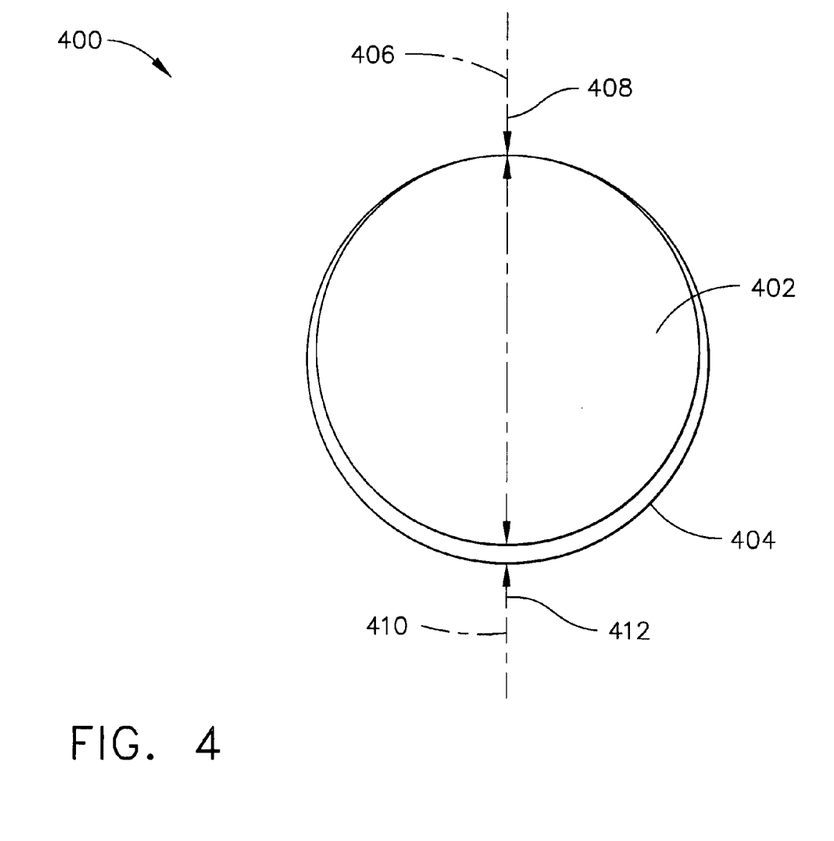
FIG. 4 is a cross-sectional diagram of an exemplary chrome plated wheel that may be used with the system shown in FIG. 1 to illustrate the effects of varying material properties on measured gap distance.

FIG. 4 is a cross-sectional diagram of an exemplary chrome plated wheel 400 that may be used with system 10 (shown in FIG. 1) to illustrate the effects of varying material properties on measured gap distance. Wheel 400 includes a body 402 fabricated from 4140 steel and a varying thickness coating 404 of chrome. At a first radial 406, a thickness 408 of chrome is zero mils. At a second radial 410, a thickness 412 of chrome is fourteen mils. Between first radial 406 and second radial 410 the thickness of chrome plate varies substantially proportionally with circumferential distance from radials 406 and 410.

Figure 5:
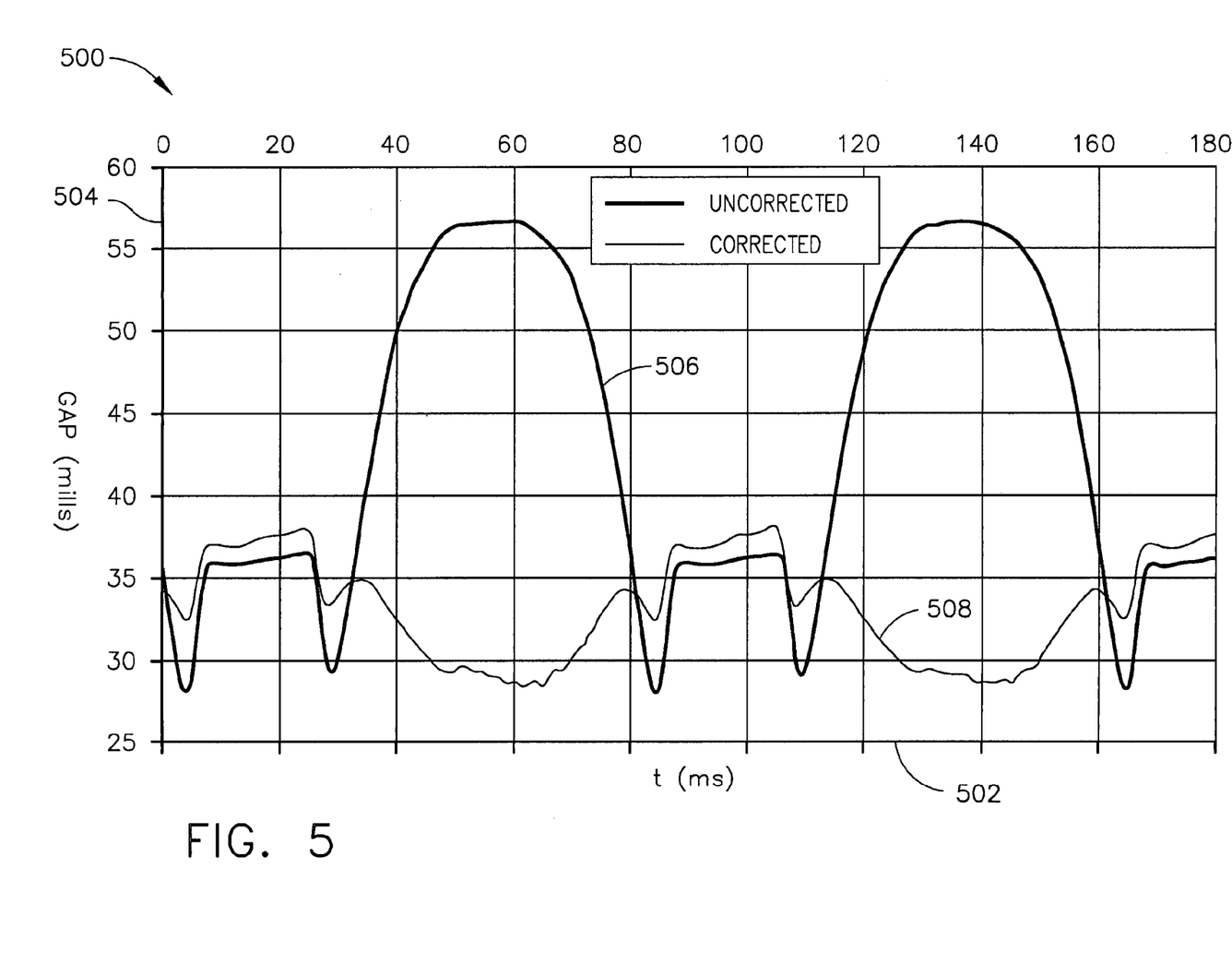
FIG. 5 is an exemplary graph of an output of the transducer shown in FIG. 1 illustrating the effects of a varying target material property on measured gap.

FIG. 5 is an exemplary graph 500 of an output of transducer 12 illustrating the effects of a varying material property of wheel 400 on measured gap. In the exemplary embodiment, wheel 400 was rotated proximate transducer 12 such that transducer 12 was positioned normal to the chrome plated surface of wheel 400. An x-axis 502 is a time-base scale in milliseconds that may be used to correlate the thickness of the chrome plate on rotating wheel 400 as measured by transducer 12. A y-axis 504 is scaled in measured mils of gap between transducer 12 and rotating wheel 400. Although the actual gap between wheel 400 and transducer 12 was substantially constant at thirty-four mils, the measured gap varies widely due the effects of the varying material properties of rotating wheel 400. Graph 500 includes an uncompensated trace 506 that illustrates the output of transducer 12 when the gap between transducer 12 and wheel 400 is a constant approximately thirty-four mils with no intentional correction for the varying material properties of rotating wheel 400. Graph 500 also includes a trace 508 that illustrates the output of transducer 12 when the gap between transducer 12 and wheel 400 is a constant approximately thirty-four mils using a non-linear 3D curve fit to facilitate reducing the run out due to the varying material properties of rotating wheel 400. Uncompensated run out is approximately twenty-five mils, whereas the compensated run out is approximately ten mils.

Figure 6:
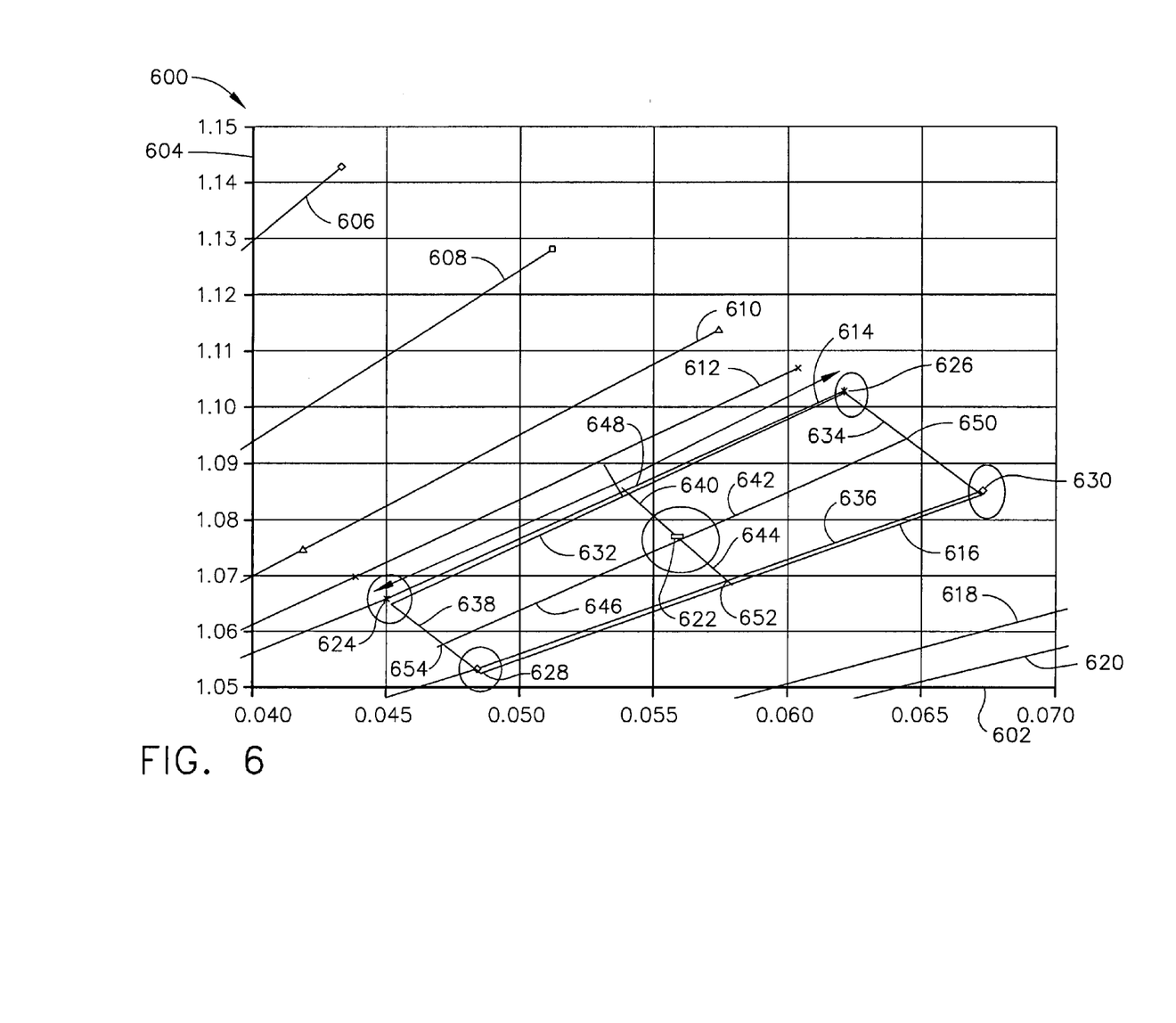
FIG. 6 is a normalized impedance graph illustrating an exemplary method of determining gap that facilitates reducing runout.

FIG. 6 is a normalized impedance graph 600 illustrating an exemplary method of determining gap that facilitates reducing runout. Graph 600 includes an x-axis 602 that is scaled in normalized resistance. A y-axis 604 is scaled in normalized impedance. A plurality of normalized impedance curves 606, 608, 610, 612, 614, 616, 618, and 620 represent the normalized impedance of transducer 12 at known gaps and known material properties, such that a measured impedance value of transducer 12 that falls directly on one of curves 606, 608, 610, 612, 614, 616, 618, or 620, may be correlated to a particular gap. For values of measured impedance values of transducer 12 that fall between curves 606, 608, 610, 612, 614, 616, 618, and 620, a method of interpolation using linear projection may be applied.

In the exemplary embodiment, there are five main steps to determining linear projections to interpolate impedance values to corresponding to the gap between transducer 12 and target 30 and/or the material properties of target 30. These steps assume a data structure with data points that are relative to a predetermined target property, such as, a set of normalized impedance curves has been populated and is accessible to system 10. In the exemplary embodiment, the data structure that includes the normalized impedance curves is a look-up table. In an alternative embodiment, the data structure includes the normalized impedance curves in a mathematical algorithm. A data point 622 represents a normalized impedance value of transducer 12 when the output is sampled as described above while wheel 400 is rotating with transducer 12 positioned proximate coating 404. The steps interpolation using linear projection include:

1) Select a plurality of data points 624, 626, 628, and 630 that data point 622 reading falls between, such that the impedance values of data points 624, 626, 628, and 630 may be determined.
2) Connect adjacent data points 624 and 626, 626 and 628, 628 and 630, and 630 and 624 such that the resulting line segments 632, 634, 636, and 638 define a box enclosing data point 622.
3) Determine the minimum distance from each segment 632, 634, 636, and 638 to data point 622, such that the minimum distance is represented by a respective line segment 640, 642, 644, and 646 that is normal to each corresponding line segment 632, 634, 636, and 638.
4) Determine a point of intersection 648, 650, 652, and 654 of each pair of the minimum distance line segments 640, 642, 644, and 646 and the corresponding selected data point connecting line segments 632, 634, 636, and 638.
5) Interpolate to determine the gap and the target material property of interest based on the interpolated values of points of intersection.

To illustrate the exemplary steps above, a normalized data point 622 may be a reading of 4140 steel that may include a value for normalized resistance ($R_n$) equal to 0.0557 and a value for normalized reactance ($\omega L_n$) equal to 1.077 (units omitted). The first step is to determine where data point 622 is located on normalized impedance graph 600 and to select data points 624, 626, 628, and 630. In the exemplary embodiment, data points 624, 626, 628, and 630 are selected by performing a linear search starting at a predetermined point, such as a point outside the bounds of the data in the data structure. After data points 624, 626, 628, and 630 are determined, projections are made to line segments 632, 634, 636, and 638 from data point 622. It is known that the shortest distance from data point 622 to line segments 632, 634, 636, and 638 is by way of a line segment that is normal to line segments 632, 634, 636, and 638 and includes data point 622. As such the dot product of each line segment 632, 634, 636, and 638 and each respective minimum distance line segment 640, 642, 644, and 646 is zero. For example [line 632 dot line 640]=zero. The projections are used to interpolate to determine gap 29 value and the material properties of target 30.

Figure 7:
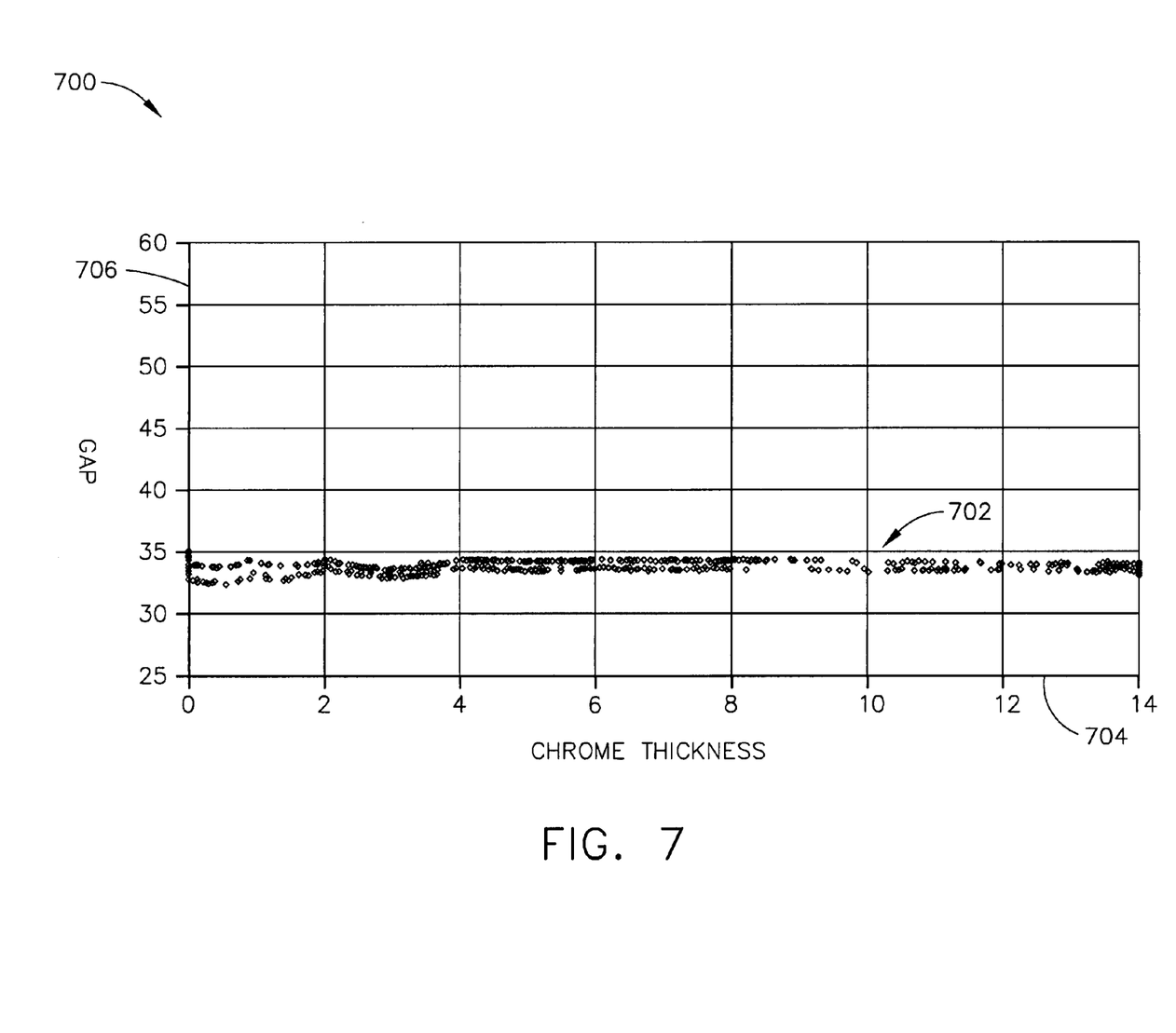
FIG. 7 is a graph of an output of system using a linear projection interpolation algorithm.

FIG. 7 is a graph 700 of an output of system 10 using the linear projection interpolation algorithm described above. Graph 700 includes a plurality of data points 702 that define a response of system 10 to wheel 400 rotating proximate to transducer 12 such that gap 29 was established at 34 mils. Each data point 702 correlates a gap output of system 10 to the chrome plate coating thickness of wheel 400 as wheel 400 rotates proximate transducer 12. Graph 700 includes a x-axis 704 that represents a thickness of chrome plate coating on wheel 400 when each associated data point was sampled, and an y-axis 706 that represents the gap value measured by system 10 using the linear projection interpolation algorithm. The output data points 702 of system 10 using the linear projection interpolation algorithm may be compared to the output of system 10 using a non-linear 3D curve fit (trace 508 in FIG. 5) and the uncompensated output of system 10 (trace 506 in FIG. 5). In each case, the actual gap between transducer 12 and wheel 400 is a constant 34 mils. The variation of the data point amplitudes illustrated in FIGS. 5 and 7 is due to the material properties, such as chrome plate thickness, of wheel 400. The linear projections calculation illustrated in FIG. 7 has significantly less run out than both the uncompensated method (trace 506 in FIG. 5) and the non-linear 3D curve fit method (trace 508 in FIG. 5). The runout using the linear projections calculation illustrated in FIG. 7 is approximately two mils, which is an approximately eighty percent reduction compared to the non-linear 3D curve fit method (shown in FIG. 5) and an approximately ninety two percent reduction compared to the uncompensated method.

Figure 8:
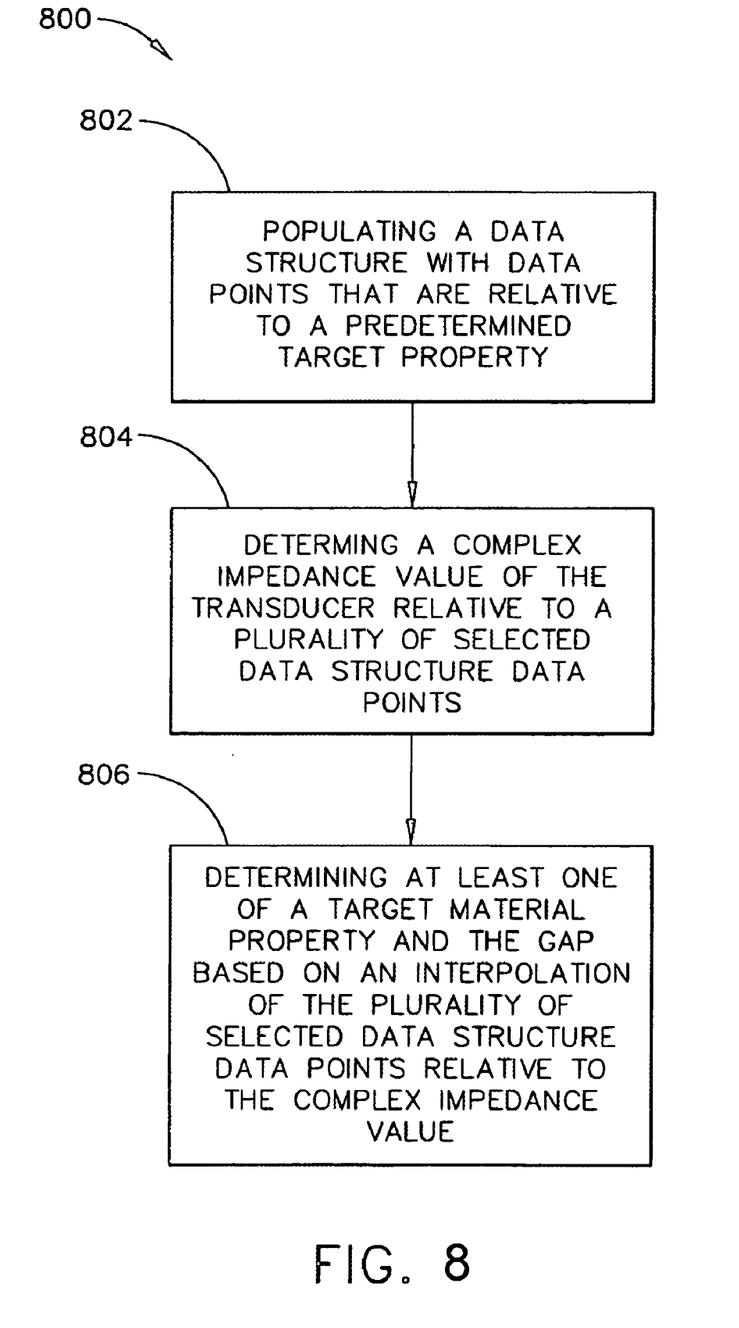
FIG. 8 is a block diagram of an exemplary method that may be used with the system shown in FIG. 1 to determine a gap between an eddy current proximity transducer and a target and/or target material property.

FIG. 8 is a block diagram of an exemplary method 800 that may be used with system 10 (shown in FIG. 1) to determine a gap between an eddy current proximity transducer and a target and/or target material property. The method includes populating 802 a data structure with data points that are relative to a predetermined target property, determining 804 a complex impedance value of the transducer relative to a plurality of selected data structure data points, and determining 806 at least one of a target material property and the gap based on an interpolation of the plurality of selected data structure data points relative to the complex impedance value.

The above-described methods and system provide a cost-effective and reliable means for facilitating reducing runout in machinery vibration readings and for identifying at least one material property of a target, for example, a digital eddy current proximity system may be used to measure the gap between a target, such as a rotating machine shaft, and/or material properties of the target, such as, the target conductivity, target permeability and/or a surface finish of the target. More specifically, the methods and system facilitate using a linear projection interpolation method to determine the gap and/or target material property in a cost-effective and reliable manner.

Exemplary embodiments of digital eddy current proximity systems are described above in detail. The systems are not limited to the specific embodiments described herein, but rather, components of each system may be utilized independently and separately from other components described herein. Each system component can also be used in combination with other system components.

While the invention has been described in terms of various specific embodiments, those skilled in the art will recognize that the invention can be practiced with modification within the spirit and scope of the claims.

What is claimed is:

1. A method of determining a gap defined between an eddy current proximity transducer and a target, said method comprising:

populating a data structure with data points that are relative to a predetermined target property including at least one of a target conductivity, a target material composition, a target surface treatment, and a target permeability;

determining a complex impedance value of the transducer relative to a plurality of selected data structure data points; and determining at least one of a target material property and the gap based on an interpolation of the plurality of selected data structure data points relative to the complex impedance value.

2. A method in accordance with claim 1 wherein populating a data structure with data points that are relative to a predetermined target property comprises populating the data structure with data that corresponds to a complex impedance value of the transducer.

3. A method in accordance with claim 1 wherein populating a data structure with data points that are relative to a predetermined target property comprises populating the data structure with data points that define a plurality of curves.

4. A method in accordance with claim 1 wherein the data structure data points define a plurality of curves and wherein determining the complex impedance value of the transducer relative to a plurality of selected data structure data points comprises:

selecting a first data point that lies on a first of the plurality of curves;

selecting a second data point that lies on a second of the plurality of curves, such that the complex impedance value lies between the first of the plurality of curves and the second of the plurality of curves; and interpolating between the first data point and the second data point to determine the complex impedance value of the transducer.

5. A method in accordance with claim 4 wherein interpolating between the first data point and the second data point comprises interpolating between the first data point and the second data point using linear projection.

6. A method in accordance with claim 1 wherein the data structure data points define a plurality of curves and wherein determining the complex impedance value of the transducer relative to a plurality of selected data structure data points comprises:

selecting at least one first data point that lies on at least one of the plurality of curves;

selecting at least one other data point that lies on at least one other of the plurality of curves wherein the at least one other curve is different than the at least one curve; and interpolating between the selected data points to determine the complex impedance value of the transducer.

7. A method in accordance with claim 1 wherein the data structure data points define a plurality of curves and wherein determining the complex impedance value of the transducer relative to a plurality of selected data structure data points comprises:

selecting a first data point and a second data point that lie on a first of the plurality of curves;

selecting a third data point and a fourth data point that lie on a second of the plurality of curves wherein the second curve is different than the first curve; and interpolating between the first data point, second data point, third data point, and fourth data point to determine the complex impedance value of the transducer.

8. A method in accordance with claim 7 wherein the complex impedance value is a data point that is bounded by line segments connecting adjacent ones of the first data point, second data point, third data point, and fourth data point and wherein interpolating between the first data point, second data point, third data point, and fourth data point to determine the complex impedance value of the transducer comprises using linear projection.

9. A method in accordance with claim 8 wherein using linear projection comprises determining an intersection line for each line segment that is normal to the line segment and includes the complex impedance value data point.

10. A method in accordance with claim 1 wherein populating a data structure with data points that are relative to a predetermined target property comprises populating the data structure with data points that correspond to a plurality of transducer excitation frequencies.

11. A method of determining a gap defined between an eddy current proximity transducer and a target, said method comprising:

populating a data structure with data points that are relative to at least one of a target conductivity, a target material composition, a target surface treatment, and a target permeability wherein the data points correspond a complex impedance value of the transducer;

selecting a first data point that lies on a first of the plurality of curves;

selecting a second data point that lies on a second of the plurality of curves, such that the complex impedance value lies between the first of the plurality of curves and the second of the plurality of curves; and interpolating between the first data point and the second data point to determine the complex impedance value of the transducer; and determining at least one of a target material property and the gap based on an interpolation of the plurality of selected data structure data points.

12. A method in accordance with claim 11 wherein populating a data structure with data points that are relative to at least one of a target conductivity, a target material composition, a target surface treatment, and a target permeability comprises populating the data structure with data points that define a plurality of curves.

13. A method in accordance with claim 11 wherein interpolating between the first data point and the second data point comprises interpolating between the first data point and the second data point using linear projection.

14. A system for determining a gap defined between an eddy current proximity transducer and a target, said system comprising:

a memory comprising a data structure with data points that are relative to a predetermined target property comprising at least one of a target conductivity, a target material composition, a target surface treatment, and a target permeability; and a processor configured to:

control execution of instructions to determine a complex impedance value of the transducer relative to a plurality of selected data structure data points; and control execution of instructions to determine at least one of a target material property and the gap based on an interpolation of the plurality of selected data structure data points.

15. A system in accordance with claim 14 wherein said processor is further configured to control execution of instructions to populate a data structure with data points that are relative to a predetermined target property.

16. A system in accordance with claim 14 wherein said processor is further configured to control execution of instructions to determine a complex impedance value of the transducer relative to a plurality of selected data structure data points.

17. A system in accordance with claim 14 wherein said processor is further configured to control execution of instructions to determine at least one of a target material property and the gap based on an interpolation of the plurality of selected data structure data points relative to the complex impedance value.

18. A system in accordance with claim 14 wherein said data structure comprises data points that correspond to a complex impedance value of the transducer.

19. A system in accordance with claim 14 wherein said data structure comprises data points that define a plurality of curves, said processor further configured to:

select at least one first data point that lies on at least one of the plurality of curves;

select at least one other data point that lies on at least one other of the plurality of curves wherein the at least one other curve is different than the at least one curve; and interpolate between the selected data points to determine the complex impedance value of the transducer.

20. A system in accordance with claim 14 wherein the complex impedance value is a data point that is bounded by line segments connecting adjacent ones of said selected data points, said processor further configured to interpolate between using linear projection.

21. A system in accordance with claim 14 that is substantially insensitive to variations in the target material properties.

22. A system in accordance with claim 14 that is substantially insensitive to variations in the target chrome coating.

23. A system in accordance with claim 14 that is configured to determine the target material type and gap substantially simultaneously for a plurality of material properties.

24. A system for determining a gap defined between an eddy current proximity transducer and a target, said system comprising:

a network comprising said transducer serially coupled to an electrical component;

a signal generator circuit operatively coupled to said network, said signal generator circuit configured to drive a current that includes a plurality of frequency components through said network wherein a first analog voltage is impressed across said network and a second analog voltage is impressed across said transducer;

a sampling and digitizing circuit coupled to said signal generator circuit, said sampling and digitizing circuit configured to convert the first analog multi-frequency voltage impressed across said network and said second analog multi-frequency voltage impressed across said transducer into a plurality of digitized voltages;

a convolution circuit comprising an input terminal corresponding to at least one of the plurality of component frequencies, said convolution circuit configured to convolve each digitized voltage with a digital waveform for forming a first complex number and a second complex number correlative to the first analog voltage and the second analog voltage respectively for at least one of the component frequencies;

a memory comprising a data structure with data points that are relative to a predetermined target property comprising at least one of a target conductivity, a target material composition, a target surface treatment, and a target permeability; and a processor configured to:

control execution of instructions to determine a complex impedance value of the transducer relative to a plurality of selected data structure data points; and determine at least one of a target material property and the gap based on an interpolation of the plurality of selected data structure data points using linear projection.

* * * * *